(12) United States Patent
Kikaganeshwala

(10) Patent No.: US 8,648,600 B2
(45) Date of Patent: Feb. 11, 2014

(54) METHOD FOR MEASURING SLOW ROLL CHARACTERISTICS OF PARTIALLY MACHINED SHAFT OF AN ELECTRODYNAMIC MACHINE

(75) Inventor: Yagnesh Kikaganeshwala, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 831 days.

(21) Appl. No.: 12/818,308

(22) Filed: Jun. 18, 2010

(65) Prior Publication Data

US 2011/0309828 A1    Dec. 22, 2011

(51) Int. Cl.
*G01V 3/08*    (2006.01)
(52) U.S. Cl.
USPC .............................. 324/326; 324/227; 702/56
(58) Field of Classification Search
USPC ................ 324/227; 73/660; 29/598, 469, 494
See application file for complete search history.

(56) References Cited

U.S. PATENT DOCUMENTS

| | | | |
|---|---|---|---|
| 6,741,074 B2 * | 5/2004 | DeBlock et al. | 324/227 |
| 7,222,409 B2 * | 5/2007 | Yoshida et al. | 29/598 |
| 2006/0288788 A1 * | 12/2006 | Mistry et al. | 73/660 |

* cited by examiner

*Primary Examiner* — Arleen M Vazquez
*Assistant Examiner* — Alesa Allgood

(57) ABSTRACT

An electrodynamic machine shaft slow roll measurement testing and remediation method that can be performed on a partially machined shaft. Upon completion of slow roll tests on a partially machined shaft the manufacturer may complete machining of shafts that successfully meet the test specification. If a partially machined shaft fails the test specification, the manufacturer at its option may attempt to remediate the shaft, so that it successfully meets slow roll specification upon re-testing. Exemplary remediation steps may include further concentricity machining to reduce mechanical runout or shaft treatment, such as by heating and/or quenching to reduce electrical runout. Partially machined shafts that fail slow roll test specifications (with or without remediation efforts) may be scrapped or otherwise recycled without, completing final machining operations.

12 Claims, 5 Drawing Sheets

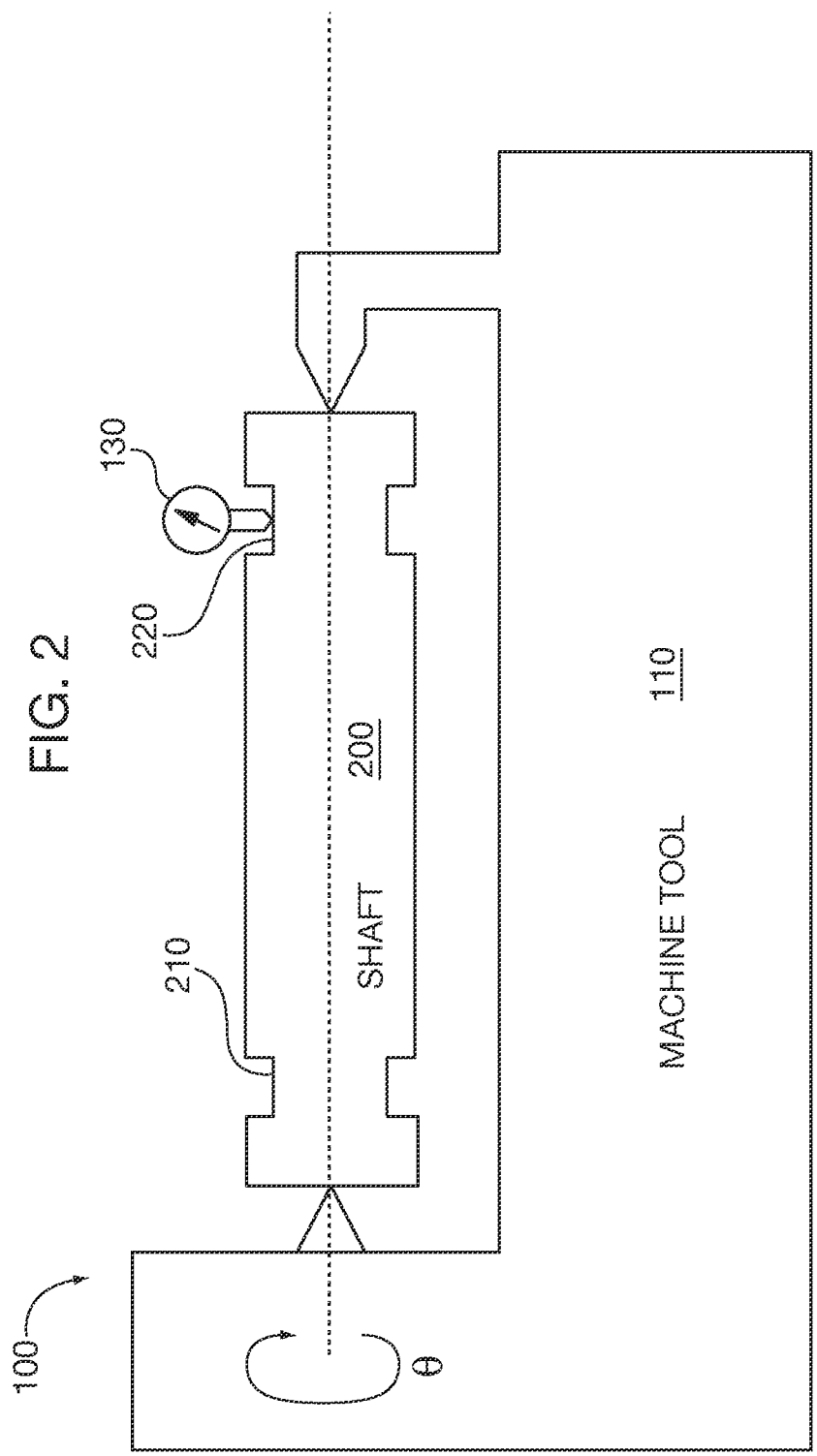

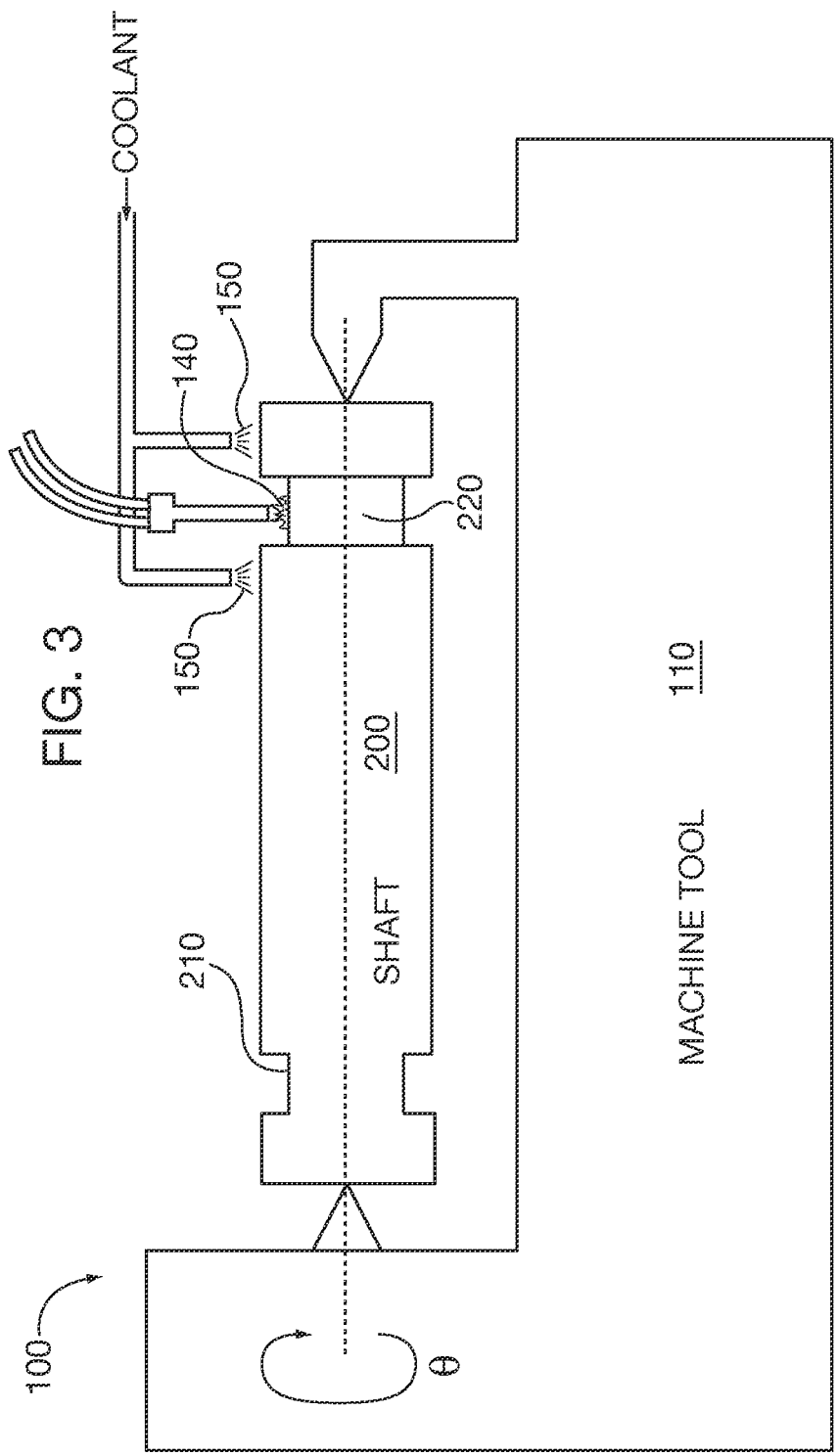

METHOD FOR MEASURING SLOW ROLL CHARACTERISTICS OF PARTIALLY MACHINED SHAFT OF AN ELECTRODYNAMIC MACHINE

BACKGROUND OF THE DISCLOSURE

1. Field of the Invention

The invention relates to electrodynamic machines, and more particularly to inspection and measurement and possible correction of electrodynamic machine shaft radial runout prior to complete machining of the shaft. The present invention is suitable for application to alternating or direct current motor shafts.

2. Description of the Prior Art

It is desirable to operate electrodynamic machines, such as electric motors, within defined vibration parameters. Variation in a shaft's radial runout about its circumference or axial length may impact shaft vibration. Thus motor manufacturers and users often specify shaft runout tolerances and/or ultimate operating vibration parameters, that are measured and confirmed after completion of shaft machining operations.

In many applications it, is also desirable to monitor electrodynamic machine vibration during operation as a potential indicator of operational abnormalities or need for maintenance service (e.g., a breaking rotor bar or shaft bearing in need of lubrication. One known way to monitor operational electrodynamic machine vibration is with at least one proximity probe, such as an eddy current proximity (e.g., radial displacements of a rotating part relative to the probe) to detect vibration values in excess of a predetermined threshold.

Proximity probes or proximity measuring systems can be used for the measurement, monitoring, and/or analysis of axial and/or radial shaft vibration (peak-to-peak displacement amplitude) in electrodynamic machinery. A proximity probe or transducer can be placed in a position defined by a mount. Read-outs from proximity probes, such as via oscilloscope, meter, automated monitoring system, and/or x-y recorder, might not provide an accurate indication of the shaft motion relative to the proximity probe or transducer, because the readings are subject to other influences.

Data read-out provided by the probe can reflect actual movement of the shaft relative to the probe, but also electrical properties of the shaft, and/or inaccuracies generated by the probe itself. The impact of shaft movement can be referred to as "mechanical runout". The impact of the electrical properties of the shaft can be referred to as "electrical runout". The impact of the probe's inaccuracies can be referred to as "probe noise".

Eddy current proximity probes can derive distances, such as proximities, utilizing induced electrical currents in the material of a rotating electrodynamic machine's shaft. Some level of inaccuracy in the values obtained from the probe can be present, however, which can be due to any number of factors, such as instrumentation error, mechanical runout, and/or electrical runout, etc., any of which can vary with measurement location. Electrical runout, often called glitch, can result from variations in electrical properties of the shaft material. Causes for mechanical runout can comprise aberrations in cross-sectional shape and/or axial flatness, etc., bearing hydrostatic effects, bearing hydrodynamic effects, etc.

A known test procedure, to assess inaccuracies comprised in values obtained from the probe, can involve rotating a shaft at a speed below and/or far below a normal operating speed. Such a test procedure can be referred to as a "slow roll" test. A displacement signal that a proximity probe provides during a slow roll test can be called a "slow roll value".

Rotating equipment can have a maximum specified slow roll value above which the rotating equipment is considered inoperable, because the slow roll, value can mask shaft movement due to dynamically variable vibration. Hence, electrodynamic machine shafts having slow roll values above designated thresholds are considered to be unsuitable for operational service in the past methods and apparatus have been developed to measure total slow roll, value, differentiate contributions to the value attributable to mechanical or electrical runout, values or probe noise, and to remediate shaft properties causing those contributions. For example, measured mechanical runout can be remediated by re-machining the shaft. Electrical runout can be remediated by selective localized heat treatment of the shaft to modify the electromagnetic properties of the shaft material. Probe noise parameters can be isolated and compensated within the proximity probe measuring and monitoring apparatus. Exemplary slow roll measurement and remediation methods and apparatus are shown and described in United States Patent Publications Nos. 2006/0288787 A1, 2006/0288788 A1, and 2010/0024199 A1, the contents of which are incorporated herein by reference.

Unfortunately, despite slow roll measurement and remediation efforts to reduce measured slow roll values below designated specifications, some shafts remain unsuitable for service and are scrapped. Each scrapped shaft represents considerable wasted finished shaft machining cost and effort.

Thus, a need exists in the art for an electrodynamic machine shaft slow roll measurement, testing and remediation method that can be performed on a partially machined shaft. With such a method the manufacturer would have the option to stop further shaft machine operations so as to minimize cost and effort associated with the test failure shaft. The manufacturer, at its option could choose to scrap a slow roll failure shaft, or perhaps recycle a portion of the shaft for a smaller frame motor. Alternatively if the slow roll tests on the partially machined shaft are successful, the manufacturer may complete the remainder of the machining operations with confidence that the shaft should meet completed shaft final slow roll measurement specifications.

SUMMARY OF THE INVENTION

Accordingly, an object of the invention is to create electrodynamic machine shaft slow roll measurement, testing and remediation method that can be performed on a partially machined shaft. Upon completion of slow roll tests on a partially machined shaft the manufacturer may complete machining of shafts that successfully meet test specification. Under this objective, if a partially machined shaft fails the test specification the manufacturer at its option may attempt to remediate the shaft so that it successfully meets slow roll specification upon re-testing. Under this objective, partially machined shafts that fail slow roll test specifications (with or without remediation efforts) may be scrapped or otherwise recycled without completing final machining operations.

These and other objects are achieved in accordance with the present invention by partially machining an electrodynamic machine shaft in at least one area of interest and thereafter testing slow roll characteristics in that area of interest. Partially machined shafts successfully completing such slow roll tests may then be designated for complete machining. Optional remediation attempts, such as further grinding to reduce mechanical runout or thermal treatment to reduce electrical runout may be initiated on failed shafts, in order to attempt to meet slow roll specifications and thereafter complete all shaft machining operations. Partially machined shafts that fail to meet cloy roll specifications after remediation may be scrapped or otherwise recycled without completing final machining operations. A manufacturer at its discretion may choose to scrap or recycle a shaft at its discretion at any point, in the practice of the present invention.

Objects of the present invention may be practiced separately or jointly at the discretion of one skilled in the arts of electrodynamic machine manufacture, maintenance or repair.

An aspect of the present invention is directed to a method for testing slow roll on a partially machined electrodynamic machine shaft, so that additional machining operations do not have to be completed on a potentially unsuitable shaft. The method includes the step of machining a shaft at a designated testing location prior to completing all shaft machining operations. The next step includes measuring shaft slow roll at the designated testing location. If the slow roll measurement is below the designated slow roll threshold the shaft is designated as suitable for performing further machining operations. If the shaft exceeds the designated slow roll, threshold it may be selectively remediated at the designated testing location as necessary to conform the shaft slow roll measurement to below the designated slow roll threshold. The measuring step is re-performed after remediation.

Another aspect of the present invention is directed to a method for testing slow roll on a partially machined electrodynamic machine shaft, so that additional machining operations do not have to be completed on a potentially unsuitable shaft. The method includes machining a shaft at one or more designated testing locations prior to completing all shaft machining operations, for example at shaft journal bearing sites. The shaft is then slow roll tested for aggregate electrical runout with a proximity measuring system. The shaft may be designated for final machining if its slow roll value is less than a designated threshold. If the shaft slow roll value exceeds the designated threshold, its mechanical runout at the designated testing location is measured. The shaft may be re-machined as necessary, using known methods, to conform the shaft mechanical runout to below a designated mechanical runout threshold. If re-machining is not successful the shaft may be scrapped.

If the shaft successfully meets mechanical runout specifications, further method steps of the present invention are performed. The next step of the present invention is to re-measure slow roll electrical runout at the designated testing location with the proximity measuring system. Known electrical runout testing methods may be used for slow roll testing. In the present invention a preferred, but not required, electrical runout testing method employs an eddy current probe measuring system that associates electrical runout with voltage variations.

Shafts that successfully meet the electrical runout specification are designated as suitable for further machining operations necessary to complete the shaft. If the shaft does not meet the electrical runout specification, it may be treated at the designated testing location as necessary to conform the electrical runout to below a designated electrical runout threshold. Known forms of treating may be utilized, including selective heating and quenching methods. If after treatment the shaft meets electrical runout specification, it may be designated suitable for performing further machining operations. Shafts that no not meet mechanical or electrical runout specifications are designated unsuitable for further machining, and may be scrapped or otherwise recycled at the manufacturer's discretion.

Machining, measuring and treating steps of the present invention may be performed while the shaft is in situ within a machine tool, such as a lathe, grinder or machining center. One or more of the steps of the present invention, or any combination thereof, may be manually or automatically performed. For example, any combination of the method steps of the present invention may be performed on a automated machine tool receiving operational instructions from a factory automation system.

BRIEF DESCRIPTION OF THE DRAWINGS

The teachings of the present invention can be readily understood by considering the following detailed description, in conjunction with the accompanying drawings, in which:

FIG. 2 is a schematic elevational view of the method of the present invention being performed on a partially machined electrodynamic machine shaft, showing mechanical runout slow roll testing of the present invention being performed on areas of interest on the shaft;

FIG. 3 is a schematic elevational view of the method of the present invention being performed on a partially machined electrodynamic machine shaft, showing an exemplary shaft treating step of the present invention, utilizing an exemplary possible combination or heating and/or quenching being performed on areas of interest on the shaft.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in testing and attempted remediation of partially machined electrodynamic machine shafts prior to completion of machining operations. In this manner, the manufacturer does not have to waste time, effort and resources to complete machining of electrodynamic machine shafts that ultimately would fail final slow roll testing procedures.

Apparatus Overview

Figure 1:
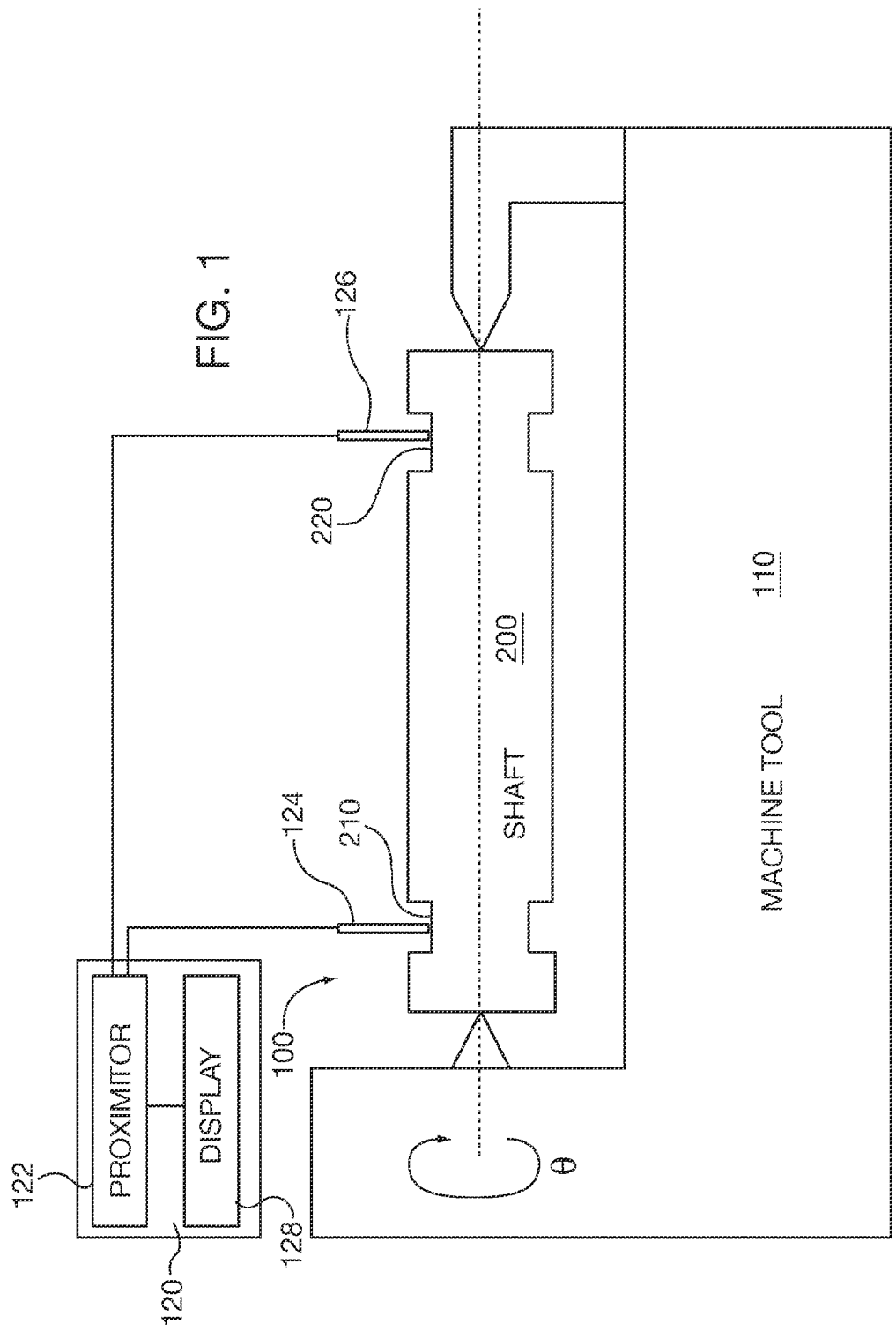
FIG. 1 is a schematic elevational view of the method of the present invention being performed on a partially machined electrodynamic machine shaft, showing electrical runout slow roll testing of the present invention being performed on areas of interest on the shaft.

FIGS. 1-3 show generally exemplary embodiments of slow roll testing and remediation apparatus 100 used to perform the methods of the present invention. The apparatus 100 includes a machine tool 110 having a bed in which a partially machined electrodynamic machine shaft 200 is rotatively mounted. The machine tool 110 is of any known type used to machine electrodynamic machine shafts, and may include lathes, grinders, machining centers (including CNC machining centers) or the like. Any desired single machine tool or combination may be used in the practice of the present invention. For example, initial partial machining of a shaft may be performed on a lathe, but one skilled in the art may choose to perform portions of final machining on a grinder.

An exemplary partially machined electrodynamic machine shaft is shown as an induction motor shaft 200. The present invention may be applied to slow roll testing of any type of known electrodynamic machine shaft 200. As is known in the art, such shafts may be formed from solid bar round or other shape stock, multiple joined components (e.g., welded sections) and forgings.

Shaft 200 has one or more partially machined areas of interest 210, 220, advantageously where it is intended that slow roll measurements of completely machined shafts will be taken in the future. For example, the partially machined areas of interest 210, 220 may correspond to intended shaft bearing journals. To this end, a manufacturer optionally may perform oversize partial machining for slow roll testing purposes and then complete final machined dimensions after the testing. The areas of interest 210, 220 may be machined on machine tool 110, or those areas may have been machined prior to coupling of the shaft 200 into the machine tool.

When practicing the present invention, it is advantageous to determine whether a shaft blank 200 has the ultimate potential of being machined into a completed shaft that will meet slow roll specifications for the completed electrodynamic machine. By performing slow roll tests on a partially machined shaft 200, those that might potentially meet intended slow roll specifications are distinguished from those that will not be capable of meeting the specifications. Thus, by weeding out defective shafts early in the manufacturing process, a manufacturer can focus efforts on shafts that will more likely meet finished shaft slow roll specifications.

FIG. 1 shows a schematic view of the test apparatus 100 configured for exemplary slow roll electrical runout testing of shaft 200. A proximity measurement testing instrument 120 includes a proximitor 122 that is coupled to known eddy current probes 124, 126. The proximitor 122 associates probe 124, 126 output readings as a function of the gap between the probe tip and the surface of the area of interest. Probes 124, 126 are coupled to the machine tool 110 a fixed distance from the corresponding shaft areas of interest 210, 220. As is known in the art, some slow roll electrical runout testing procedures utilize more than one eddy current probe at each area of interest. Similarly, in some known test procedures only a single area of interest or multiple areas of interest may be tested for slow roll. For the sake of simplicity in explaining application, of the present invention, only one eddy current probe is shown at each area of interest. One skilled in the art, may apply any known slow roll measurement procedure in application of the present invention.

In the testing apparatus 100 electrical runout slow roll testing procedure shown in FIG. 1, eddy current probes 124, 126 are coupled to the proximity measurement testing instrument 120 and the proximitor associates probe output readings as a function of the gap between the probe tip and the surface of the area of interest. In the case of electrical runout tests, one skilled in the art is interested in variance of the readings as a function of shaft 200 angular position θ, as the shaft is rotated at an angular speed usually less than the induction machine's intended operational speed. For example, the slow roll test may be performed as the shaft 200 is rotated at 20-30 revolutions per minute. Proximitor 122 is advantageously coupled to display 128 that shows probe readout as the shaft 200 is rotated.

An exemplary display 128 readout may be probe output voltage, in which case there will be a display voltage variation. One skilled in the art appreciates that the aggregate slow roll electrical runout reading is influenced by mechanical runout variances (i.e., out of is round or twists in the shaft area or interest 210, 220 over its outer circumference, measured as a function of shaft angular position θ), electrical runout variances caused by variations in local electrical conductivity/resistivity properties of the shaft material, and instrumentation "noise" caused by the eddy probes 124, 126, associated electrical wiring or the instrumentation itself. One skilled in the art will compensate for noise variances through initial calibration or other compensation methods known in the art.

If the shaft 200, when tested as shown in the apparatus 100 of FIG. 1, has slow roll electrical runout below the designated electrical runout slow roll, threshold, it may be designated as suitable for further machining operations. Conversely, if the shaft 200 exceeds the electrical runout slow roll threshold, further testing will be necessary by reconfiguring the test apparatus 100 or by moving the shaft 200 to a different testing apparatus.

FIG. 2 shows test apparatus 100 configured for performing a slow roll mechanical runout test. Shaft 200 is rotatively coupled to machine tool 110 and a dial indicator 130 is coupled to the machine tool at a fixed distance from each shaft area of interest 210, 220 using known fixtures (not shown). Mechanical runout as a function of shaft angular position is measured. If shaft 200 mechanical runout exceeds designated thresholds at any area of interest, that area may be remediated by reaching. After remediation, mechanical runout may be re-measured to confirm that it now meets mechanical runout tolerances. Shafts 200 that fail to meet mechanical runout tolerances may be scrapped.

When a shaft 200 after remediation re-machining meets mechanical runout specifications, the mechanical runout contribution and "noise" contribution of the aggregate slow roll electrical runout are subtracted from the total reading. If the difference is within acceptable electrical runout thresholds, the shaft 200 may be designated as suitable for further machining operations. Optionally the manufacturer may choose to re-run the entire electrical runout slow roll test, or any portion thereof, after confirming that mechanical runout meets specification. Conversely, if the shaft 200 still does not meet electrical runout specifications, electrical properties of the shaft may be a suspect cause of the unacceptable variance.

FIG. 3 shows test apparatus 100 configured for electrical runout shaft 200 remediation. Shaft 200 is rotatively coupled to machine tool 110 and rotated to a desired angular position. Known methods for shaft 200 electrical remediation employ localized application of heat, schematically shown by gas flame 140 and/or quenching, shown schematically by coolant spray 150, in order to attempt to modify the shaft conductivity/resistivity impact on eddy current probe readings. It is contemplated that any known method of shaft electrical runout remediation may be utilized in performance of the present invention. Upon competition of an electrical runout thermal or any other remediation process, slow roll tests may be re-performed to determine whether the shaft 200 now meets slow roll specification thresholds at each area of interest 210, 220. Further machining may be necessary, for example if the thermal treatment inadvertently caused shaft warpage that will negatively impact shaft mechanical runout.

Exemplary Methods of the Present Invention

Figure 4A:
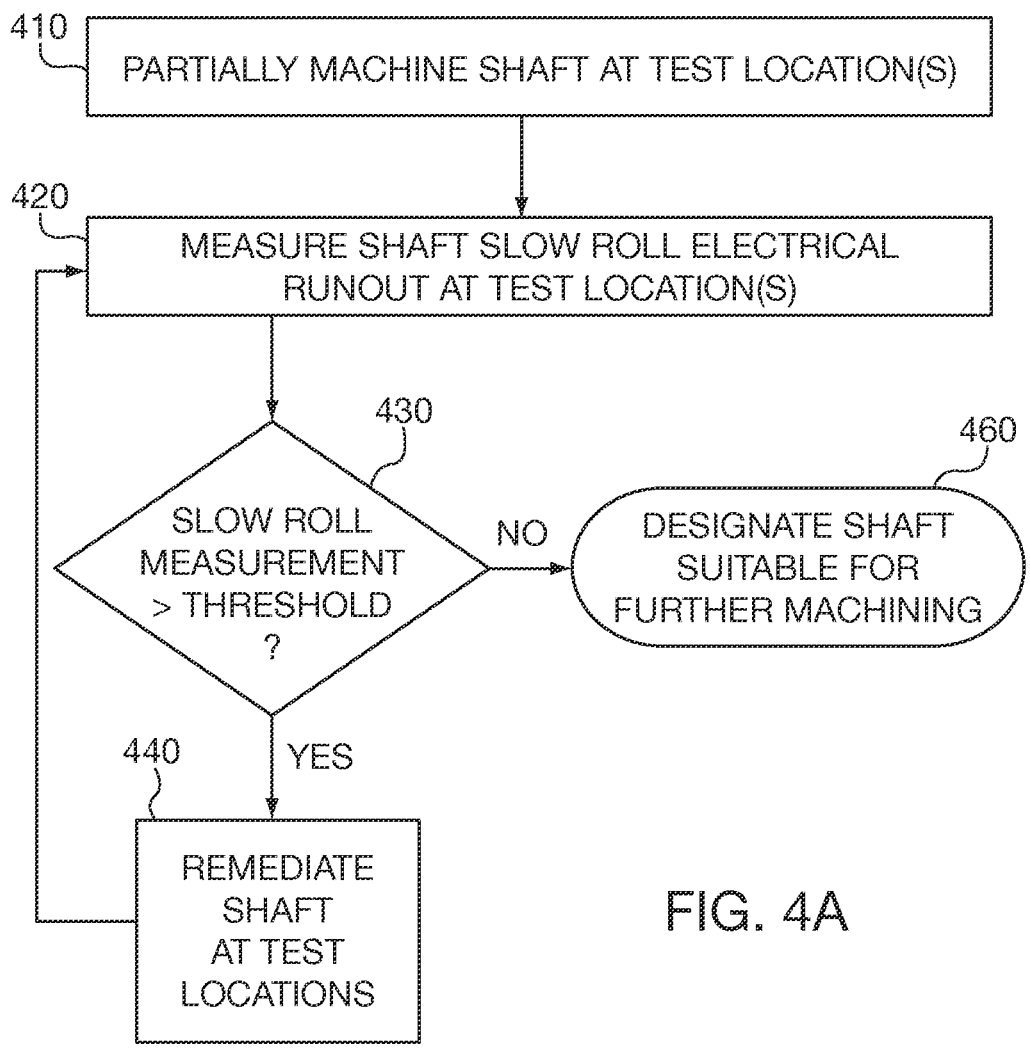
FIGS. 4A and 4B are flowcharts showing exemplary embodiments of the testing and remediation methods of the present invention.

FIG. 4A shows the general method steps of the present invention. In step 410, a shaft 200 is partially machined at one or more test location areas of interest, such as at a designated location for a bearing journal. In step 420 the shaft 200 slow roll electrical runout is measured at the test location areas of interest 210, 220. As shown in step 430, the slow roll measurement is less than the designated specification threshold, that shaft is designated as suitable for further machining operations (step 460). If the shaft 200 slow roll measurement exceeds the designated specification threshold, that shaft is remediated in step 440 (ea, by additional machining and/or thermal treatment) to attempt to lower the slow roll measurement below the threshold. After remediation step 440, the shaft 200 slow roll is re-measured by repeating step 420. At any step during the practice of the present method, the manufacturer may choose to designate any shaft 200 for further processing or scrapping.

Figure 4B:
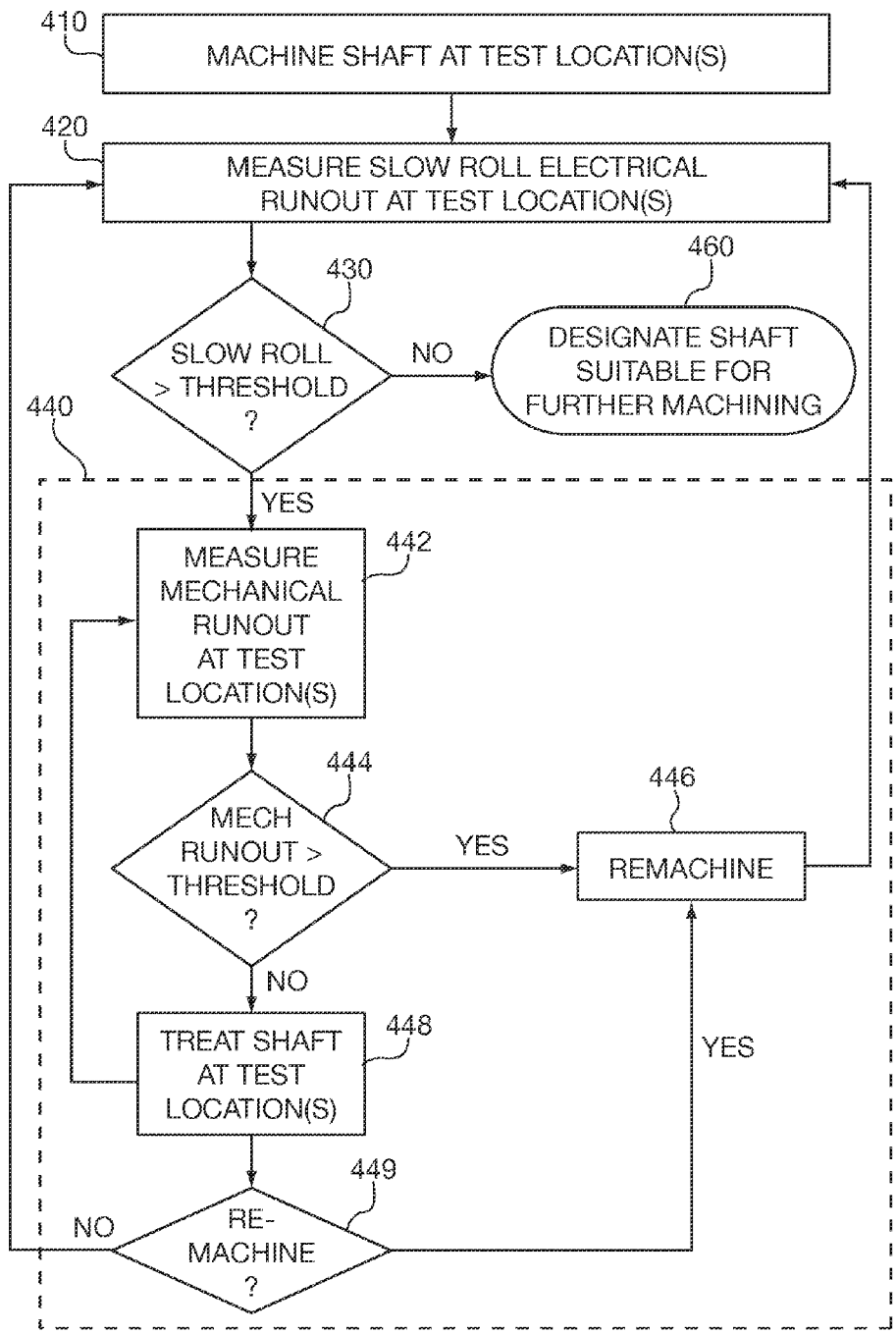

FIG. 4B amplifies in greater detail an exemplary remediation step 440. One skilled in the art may choose to modify the remediation 440 or other method steps sequence as well as add additional repetitive confirmation steps as may be desired for any particular application of the present invention.

In remediation step 440 of FIG. 4b, any shaft 200 that exceeds the aggregate slow roll electrical runout threshold, previously determined at step 430, is measured for mechanical runout in step 442. If mechanical runout exceeds the specified threshold (step 444) the failing area of interest 210, 220 is re-machined (step 446) in order to attempt to improve shaft concentricity. As shown in exemplary FIG. 4B, the re-machined shaft of step 446 is retested for slow roll aggregate electrical runout (step 420). Alternatively one skilled in the art could choose to re-measure mechanical runout by repeating step 442 after re-machining in step 446, prior to retesting aggregate electrical runout as specified in step 420. If in remediation step 440 it is determined at step 444 that mechanical runout does not exceed the specification threshold, the shaft 200 test location 210, 220 area of interest is treated at step 448 (e.g., by known thermal/heating/quenching methods) to attempt to remediate electrical properties. After completion of the treatment step 448, one may choose to re-machine the shaft (for example, if a post step 448 treatment quality control measurement of mechanical runout indicates that the shaft has been warped during treatment) or re-measure aggregate electrical runout slow roll by repeating step 420. As one skilled in the art can appreciate, the method of the present invention can be iteratively practiced in whole or in any group of desired sub-steps on any individual shaft 200.

Although various embodiments which incorporate the teachings of the present invention have been shown and described in detail herein, those skilled in the art can readily devise many other varied embodiments that still incorporate these teachings.

What is claimed is:

1. A method for testing slow roll on a partially machined electrodynamic machine shaft, comprising the steps of:
    performing a first set of minimal machining operations on a shaft that are necessary for:
    coupling and rotating the shaft in a slow roll test apparatus, and
    performing a slow roll measurement on the shaft at a designated testing location prior to completing all shaft machining operations;
    coupling the shaft to a slow roll test apparatus;
    measuring shaft mechanical runout at the designated testing location and thereafter:
        designating the shaft suitable for performing further slow roll electrical runout testing when the slow roll mechanical runout measurement is below a specified mechanical runout threshold, or
        selectively remediating the shaft only at that location by re-machining as necessary to conform the shaft mechanical runout to below the specified mechanical runout threshold, or
        scrapping the shaft without undertaking further machining operations if the remediation operations do not conform shaft mechanical runout to below the specified mechanical runout threshold;
    measuring slow roll electrical runout at the designated testing location with a proximity measuring system, and thereafter:
        designating the shaft suitable for performing a second set of machining operations intended to complete shaft manufacture, with any desired machining tools, when the slow roll electrical runout measurement is below a specified electrical runout threshold, or
        selectively remediating the shaft only at that location by treating the shaft blank at the designated testing location as necessary to conform the electrical runout to below a the specified electrical runout threshold; or
        scrapping the shaft without undertaking further machining operations if the electrical runout remediation operations do not conform shaft electrical runout to below the specified electrical runout threshold; and
    preparing the shaft for performance of the second set of machining operations if so designated during prior testing steps.

2. The method of claim 1, wherein the machine tool is a grinder.

3. The method of claim 1, wherein the machine tool is a programmable machining center.

4. The method of claim 1, wherein treating step is performed by selective application of heating and/or quenching sources coupled to the machine tool as the shaft blank is rotated by the machine tool.

5. The method of claim 1, further comprising performing additional machining operations on the shaft while it remains in situ in the machine tool.

6. The method of claim 1, wherein the shaft designated testing location is a journal bearing surface.

7. The method of claim 1, wherein the slow electrical runout measuring step is performed with an eddy current probe proximity measuring system coupled to the machine tool as the shaft blank is rotated by the machine tool.

8. The method of claim 7, wherein the proximity measuring system associates electrical runout with measured voltage deviation as the shaft is rotated.

9. A method for testing slow roll on a partially machined electrodynamic machine shaft, comprising:
    placing a shaft in a machine tool and thereafter performing the following steps in situ only at a designated testing location on the shaft prior to completing any other shaft machining operations:
    machining the shaft blank so that mechanical runout is below a designated mechanical runout threshold and scrapping the shaft blank if mechanical runout is not below the mechanical runout threshold;
    measuring slow roll electrical runout with a proximity measuring system on shafts that have not been previously scrapped, treating the shaft at the testing location as necessary to lower said electrical runout below a designated electrical runout threshold, and scrapping the shaft blank if the electrical runout is not below the electrical runout threshold; and
    thereafter designating the shaft blank suitable for performing further machining operations on any desired machine tools when the respective mechanical and electrical runouts are below their designated runout threshold.

10. The method of claim 9, wherein the slow roll electrical runout measuring step is performed with an eddy current probe proximity measuring system coupled to the machine tool as the shaft is rotated by the machine tool, the proximity measuring system associating electrical runout with measured voltage deviation.

11. The method of claim 9, wherein treating step is performed by selective application of heating and/or quenching sources coupled to the machine tool as the shaft is rotated by the machine tool.

12. The method of claim 9, wherein the shaft designated testing location is a journal bearing surface.

* * * * *